(12) United States Patent
Burr et al.

(10) Patent No.: US 9,047,161 B1
(45) Date of Patent: Jun. 2, 2015

(54) DISCOVERY, CONSOLIDATION, AND ARCHIVAL OF MULTIPLE OPERATING SYSTEM SOFTWARE LICENSES

(71) Applicant: Sprint Communications Company L.P., Overland Park, KS (US)

(72) Inventors: Jonathon A. Burr, Overland Park, KS (US); John D. Felton, Leawood, KS (US); Keith A. Trotter, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 209 days.

(21) Appl. No.: 13/743,238

(22) Filed: Jan. 16, 2013

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
USPC .......................................................... 717/172
See application file for complete search history.

(56) References Cited

U.S. PATENT DOCUMENTS

| | | | | |
|---|---|---|---|---|
| 7,856,664 | B2 * | 12/2010 | De Gaetano | 726/30 |
| 8,312,423 | B1 * | 11/2012 | Webb et al. | 717/106 |
| 8,452,712 | B2 * | 5/2013 | Garst et al. | 705/59 |
| 2001/0011254 | A1 * | 8/2001 | Clark | 705/59 |
| 2002/0152194 | A1 | 10/2002 | Sathyanarayan | |
| 2003/0182563 | A1 * | 9/2003 | Liu et al. | 713/191 |
| 2005/0289072 | A1 * | 12/2005 | Sabharwal | 705/59 |
| 2006/0021067 | A1 * | 1/2006 | Jindal et al. | 726/29 |
| 2012/0089971 | A1 * | 4/2012 | Williams et al. | 717/167 |
| 2012/0311564 | A1 * | 12/2012 | Khalid | 718/1 |
| 2014/0033315 | A1 * | 1/2014 | Biswas et al. | 726/26 |
| 2014/0115672 | A1 * | 4/2014 | Wood et al. | 726/5 |
| 2014/0137261 | A1 * | 5/2014 | Chen et al. | 726/26 |

OTHER PUBLICATIONS

FAIPP Pre-Interview Communication dated Feb. 19, 2015, U.S. Appl. No. 13/744,825, filed Jan. 18, 2013.
Office Action dated Mar. 27, 2015, U.S. Appl. No. 13/744,825, filed Jan. 18, 2013.
Girouard, "How to exclude a list of full directory paths in find command on Solaris," http:/lstackoverflow.com/questions/7854975/how-to-exclude-a-list-of-full-directory-paths-in-find-command-on-solaris, Oct. 2011.
Sripal, "Pipe output to use as the search specification for grep on Linux," http:/stackoverflow.com/questions/437504/pipe-outputto-use-as-the-search-specification-for-grep-on-linux, answer, Jun. 2012.
Unix manual page for find command from archive.org, https://web.archive.org/web/20090228141550/http:/lunixhelp.ed .a c. uk/CGI/man-cgi?find, Feb. 2009.

* cited by examiner

*Primary Examiner* — John Chavis

(57) ABSTRACT

A server software repair method. The method comprises copying a software license file associated with a software deployment, saving the software license file to a discrete directory, repeating these steps at predetermined intervals to form an archive. The method further comprises retrieving the software license file from the archive and redeploying the software license file with a software deployment.

19 Claims, 5 Drawing Sheets

DISCOVERY, CONSOLIDATION, AND ARCHIVAL OF MULTIPLE OPERATING SYSTEM SOFTWARE LICENSES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Maintenance, upgrade, and replacement of servers and other computer network components may result in the loss of the software licenses to continue using various software programs. Also, inventorying and correlating the number of software deployments across multiple servers may result in a loss of association between a particular program and the license for its use. These losses represent a financial liability as licenses need to be repurchased from a vendor or as penalties may be owed to the vendor for unauthorized use of the software.

SUMMARY

In an embodiment, a server software repair method is disclosed. The method comprises copying a software license file associated with a software deployment and saving the software license file to a discrete directory. The method further comprises repeating the steps of copying the software license file and saving the software license file to the discrete directory at predetermined intervals to form an archive. The method further comprises retrieving the software license file from the archive and redeploying the software license file with a software deployment.

In an embodiment, a license file discovery and archive device for a server system is disclosed. The system comprises a processor, and a memory having an application stored there that is executed by the processor. When executed the processor identifies vendor-specific server software files on a server system, locates vendor-specific software license files on each server of the server system, copies the vendor-specific software license files, saves the vendor-specific software license files to a common location and repeats the previous steps at intervals to form an archive.

In an embodiment, a server software license archiving method is disclosed. The method comprises identifying server software license files, locating the software license files on a server, copying the software license files, and saving the software license files to a common directory. Additionally, the archiving method is repeatable for plurality of license files and at different intervals in order to form an archive.

A server system software license management method comprises identifying license file markers for software deployed on a server system, locating files containing the license file markers, copying the identified license files and any file associated therewith, and saving all the copied files to a common location. Also, the license management system comprises repeating the steps at predetermined intervals to form an archive and accessing the archive to restore a license file and associated files to at least one server in the server system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
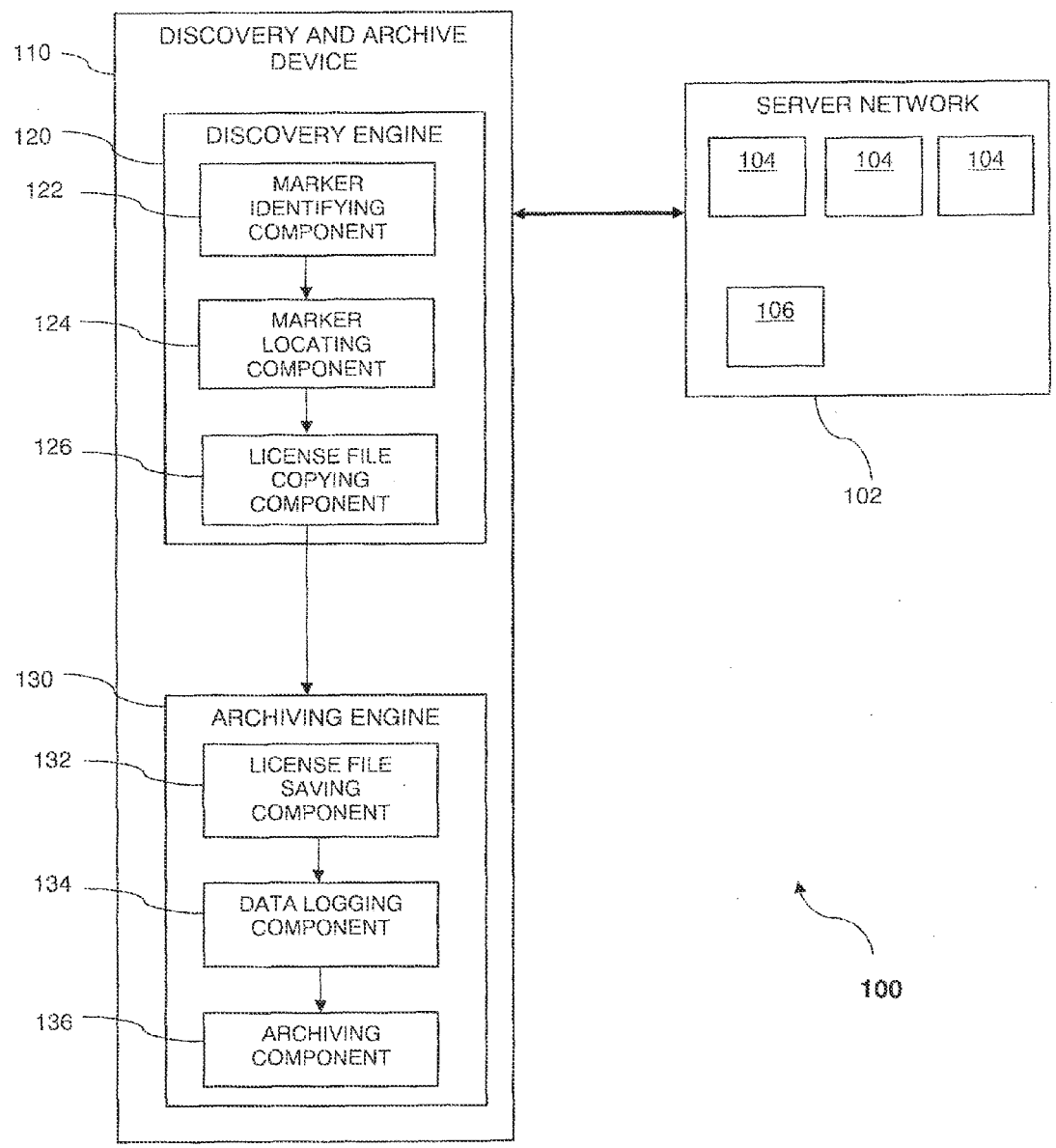
FIG. 1 illustrates an exemplary device according the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Broadly, computer and communications networks comprise a series of servers configured for continuous hosting and sharing of computer processing power to facilitate transmitting data among users. The servers contain various software packages that are installed and then activated or deployed to control the function of the server. Exemplary functions include a database server, a file server, a mail or electronic-mail server, a print server, a web or Internet server, a gaming server, a telecommunications server, or any other server, without limitations. Generally, the software functionality is dependent on an authorization, hereinafter a license, from the software vendor to the server operator or provider. In certain applications, the software vendors may require an electronic file version of the license to be stored on the server for deployment and use of that software package.

However, servers are designed for modular installation and removal in order to quickly adjust to user demand, as well as for maintenance, repair, and replacement. These processes likely involve the removal and reinstallation of software packages on a server, including the associated license file. Also, due to various events, there is potential for the removal of a software package or deployment from one server and redeployment of that software package on a new server. As the number of servers and software deployments change, the number of associate license files may likewise change. Also the license file may be corrupted, altered, or lost during these operations. The loss of a license or the net reduction in licenses compared to software deployments on servers is a liability to the operator. Purchasing surplus licenses is an unfavorable expense for a provider, but unlicensed software deployments may result in the provider owing the vendor a penalty for an unlicensed deployment or a new license. Additionally, the vendors may audit an operator's software licenses to verify that all the deployments are licensed if the vendor feels that the operator is not demonstrating sufficient care in tracking the licenses. Generally, a vendor will not penalize a provider if the provider retains possession of the license that is recovered from a corrupted, altered, or lost deployment of the vendor's software package, even if the provider cannot redeploy the software and the license. Thus, for an operator it may be financially advantageous to be able to identify, locate, preserve and track the inventory of software licenses, including those that are partially damaged in order to avoid additional vendor derived costs and penalties.

It is understood that vendors have unique text, codes, or scripts that they use within their software and license files. Generally, the software vendors or their agents will assist an operator in installing their software but, in order to streamline this process the vendors may install several packages. Deployment of the selected packages is dependent on the presence of the license. Thus, the software includes an instruction or command, that when executed by a computer processor accesses the license to verify the packages are authorized for operation or deployment. Further, the license files may include text, executable algorithms, or encryption keys that may be stored in binary form in the file or in other associated files. The present disclosure teaches a device and method for discovering and archiving the license files by identifying license files, locating the software license files, copying or relocating the license files to a common location, copying the files at regular intervals and forming an archive or history log of the software installation associated with each license.

For example, a discovery and archiving device consists of a discovery engine and an archiving engine. The discovery engine has components for identifying license markers, locating license files based on the license markers, and copying the license files. The archiving engine has components for saving the copied license files to a common library, logging information about the copied license files in the library, and tracking the changes in the saved license files and the logged information. In some configurations, the archiving engine may include a re-activation component configured to activate the discovery engine at prescribed intervals and thereby produce an archive. Alternatively, the engines of the discovery and archiving device are implemented as a processor executing software. More specifically, a device comprises software modules that consist of a command stored on a memory and when executed by a processor transforms the modules into the engines for carrying out a discovery and archiving method.

For example, identifying the specific text, codes, or scripts facilitates locating the license files as installed on the server. Identifying the license files by the unique text, codes, scripts, any executable commands or files therein as license markers of a software deployment. These license markers may be utilized to conduct a directory and registry search to locate the license files and any additional files that are associated with the license files. The associated files comprising the encryption keys or binary information may be separate from the license file itself or stored. For example, once the license files for all the vendors are located, the license files are copied to a common directory on a separate server to permit the operator to preserve the license if the software package or the server fail or are otherwise lost. It is understood that data regarding the software package, the deployment, the location of the license and the server it was located on may comprise a portion of the information that is copied to the new directory.

In another example, copying the license files from the respective servers to a common directory, initiates archiving the licenses. Archiving the licenses comprises saving the copied license files to the common directory at predetermined or prescribed intervals. Also, the data regarding the software package, the deployment, and the location of the license is concurrently saved to the new directory and stored in its own file to create an archive log. The archive log includes time/date stamps and other relevant data in order to timeline or otherwise accurately account for the duration of a software deployment and its association with a given license. The archiving of the licenses facilitates archive analysis, such that information regarding the software package, the deployment, the license, the location of the license, and other associated data may be recalled for license recovery or restoration.

Referring now to FIG. 1, a discovery and archive system 100 is illustrated. The system 100 comprises a server network 102. The server network 102 comprises a plurality of physical computers 104 dedicated to providing one or more services to users by running one or more vendor-provided software packages. Also, the server network 102 comprises an operator computer 106 for controlling the physical computers 104 and operation thereof. A discovery and archiving device 110 is in communication with the server network 102, including physical computers 104 and operator computer 106. The discovery and archiving device 110 comprises a discovery engine 120 and an archiving engine 130. The discovery engine 120 comprises a marker identifying component 122 for identifying unique indicators of at least one software license. The discovery engine 120 also comprises a marker locating component 124 for locating the identified license markers installed on server network 102. Further, the discovery engine 120 comprises a license-file copying component 126. The license-file copying component 126 produces a copy of the server network located license-files.

The archiving engine 130 further processes the copy of the server network located files in communication with the discovery engine 120 and the server network 102. The archiving engine 130 comprises a license-file recording component 132 for relocating and saving the copied license files. In certain configurations, the license-file recording component 132 records the license-file copies onto the operator computer 106 via the server network 102. The data-logging component 134 takes data relevant to the located and copied license-files, and likewise records the data to the operator computer 106 via the server network. Without limitation, the data-logging component 134 records data in a file and associates the file with the copied license-files. The data-logging component 134 records data into a file regarding the date, the time, the version or installation of the software package, the number of deployments, the number of licenses, the number of license-files with each license, the version and other information relevant to the deployment and operation of a software package, without limitation. The archiving component 136 manages the copied and stored license-files based on the data-logged information to form an operator accessible archive, including a log of changes associated with each license-file. The archiving component 136 upon creating the archive is also configurable to locate a specific license and the data-logged information based on operator determination or differential conditions. In some configurations, the archiving component 136 may include a reactivation component configured to activate the discovery engine at prescribed intervals.

Figure 2:
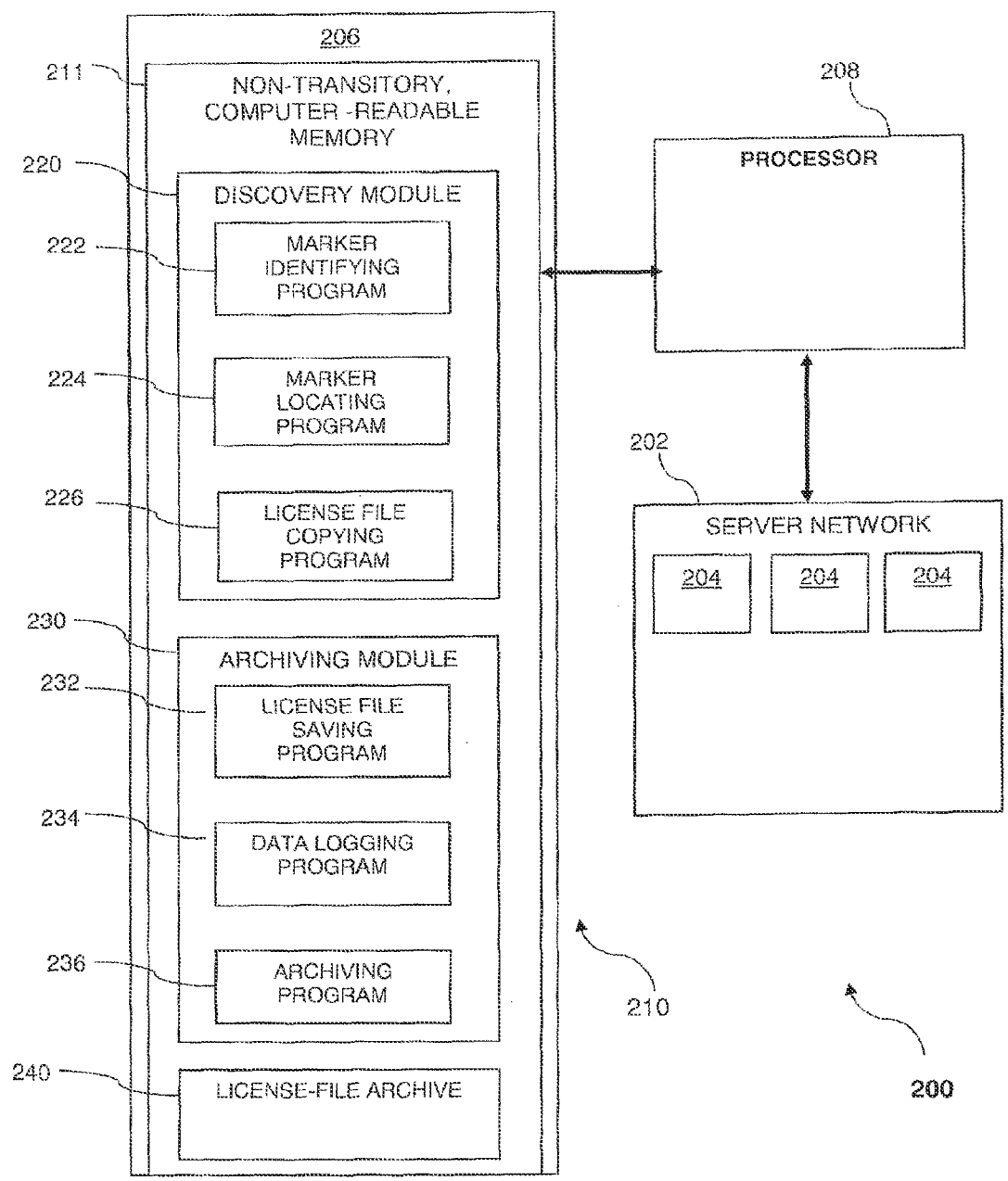
FIG. 2 illustrates an exemplary server system for carrying out the method of the present disclosure.

Referring now to FIG. 2 there is illustrated a discovery archiving system 200 wherein the engines of the discovery and archiving device are implemented as a computer system having a processor executing software. More specifically, a device comprises software modules that consist of a command stored on a non-transitory memory and when executed by a processor transforms the modules into the engines for carrying out a discovery and archiving method. For example, the discovery and archiving system 200 may be implemented as processor 208 executing software modules in communication with the server network 202. The discovery and archiving device 210 comprises the operator computer 206 in communication with or comprising a non-transitory computer-readable memory 211, having the software modules located thereon. The non-transitory computer-readable memory 211 comprises the discovery module 220, the archiving module 230, and the license-file archive 240. The discovery engine 120 illustrated in FIG. 1 corresponds with the discovery module 220 in FIG. 2. Thus, every engine component 122-126 corresponds directly with a module program 222-226. Likewise, the archiving engine 130 illustrated in FIG. 1 corresponds with the archiving module 230 in FIG. 2. Thus, every engine component 132-136 corresponds directly with a module program 232-236. The license-file archive 240 is configurable and operable as a database for sequentially storing the license-files and the data-logs for the operation of the discovery and archiving system 200 and the operator computer 206. Additionally, the license-file archive 240 may be analyzed, and selectively manipulated, for example by the archiving module 230, any program 232-236 therein, or by an operator access to the operator computer 206, in conjunction with instructions executable by the processor 208. Further exemplary systems, computers, devices, and the operation thereof according to the present disclosure, will be described hereinbelow.

Figure 3:
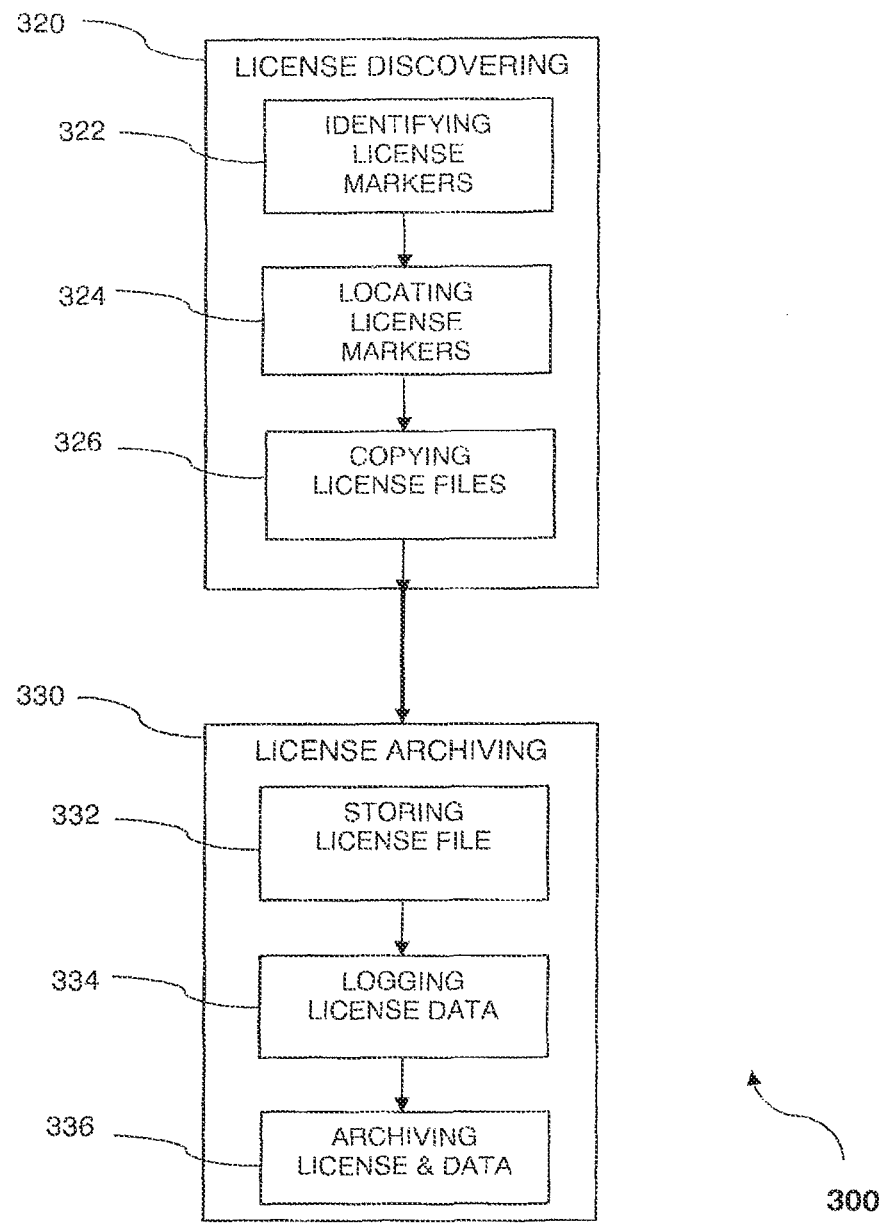
FIG. 3 illustrates an exemplary method for discovering and archiving license files.

Referring now to FIG. 3, there is illustrated a discovering and archiving method 300 configurable for discovering and archiving software licenses on a server network. Generally, the discovering and archiving method 300 relates to the sequential combination of discrete two method components: license discovering 320 and license archiving 330. Also, each method component of the discovering and archiving method 300 may be executed a plurality of times, either sequentially or in parallel. The license discovering 320 may be operated independently for example to identify and locate a license or licenses on a server system, including lost or corrupted licenses. The license discovering 320 comprises the steps of identifying license markers 322, locating the license markers 324, and copying the license files 326. The license archiving 330 may be operated independently for example to archive a known license, including inactive or decommissioned licenses. The license archiving 330 comprises the steps of storing a license file 332, logging license data 334, and archiving the license and data 336. In combination, license discovery 320 provides the license archiving 330 the licenses and associated files to facilitate the construction of an archive thereof, as well as the continued updating, maintenance, and management thereof.

The license discovering 320 is a method to identify licenses by vendor-specific markers, locate the licenses and all associate files by the vendor-specific markers, and to create a copy of the licenses and all associated files. Identifying license markers 322 comprises analyzing the operation of a vendor's software and the software's means of accessing the license information during deployment, for example on a server network. Identifying license markers 322 may comprise determining the vendor-specific file type, for example a text file, an executable file, a registry file, an encryption file, or a file querying the binary for information. Identifying the license markers 322 by determining the vendor-specific file type may comprise specific analysis or "finger printing" of the software packages installed on a server network, to track the file directories accessed during the deployment of a given software program. Also, identifying license markers 322 comprises finding conserved patterns or conventions in a vendor's licenses, software, filenames, filetypes, executables, coding, and other related information. Identifying license markers 322 may also comprise identifying markers or other information for the exclusion of unrelated vendor files. In some operations, identifying license markers 322 comprises identifying a population or plurality of licenses that are correlated to a plurality of software deployments from a single vendor. Identifying license markers 322 may include assembling a script or other temporary file that identifies the markers in a vendor-specific fashion.

Locating license markers 324 comprises searching the server directory, registry, and other locations for the licenses, all associated files, and license-specific data based upon the identified markers. As noted previously, the marker may be the file itself or a component thereof. Additionally, locating the license markers 324 comprises locating the files associated with the vendor-specific licenses, the licenses files, software deployment, general data related to the licenses, and data indicative of the licenses' statuses. As noted herein, it is possible that the locating license markers 324 comprises finding a first file that contains commands or symbolic links to access a second file. Locating license markers 324 comprises likewise locating the second file or files. Acknowledging that license files may comprise a text file, an executable file, a registry file, an encryption file, or a file querying the binary for information, it may be necessary to conduct more than one pass to locate license markers 324, particularly if that information is in a second file. For example, locating license markers 324 that were linked to second files such as registry files or binary files, may be located during a second pass through the file directory. In some cases, locating license markers 324 comprises a search through the operating system directory in order to locate all associated or symbolically-linked files. Still further, locating license markers 324 may comprise locating multiple installations and multiple deployments of the same software package and the same license. Locating license markers 324 comprises locating the inactive installations, the active deployments, and the licenses associate with each in a vendor-specific manner. Further, locating the license markers 324 comprises finding any files with data regarding the software version the license is correlated, the date of installation, the frequency of operation or access, and other general data. More specific data, such as the dates of validity of the license or the dates of operation of the license in conjunction with a software deployment are part of the method of locating license markers 324. Thus, locating license markers 324 comprises finding all the files that are indicative of a license on a server network, a server directory, or finding any files that are linked to the marker containing files, linked to a vendor's software whether active or inactive, contain data related to the software, and contain data indicative of the license's status. Without limitation by theory, locating license markers 324 comprises locating the license files that are group of the files that are related to a license or are likely related to a license.

Copying license files 326 is the reproduction of files that contain the identified and located license markers. Further, copying license files 326 comprises copying the all the file data in the license files and associated files, including the linked files. Copying the license files 326 may be concurrent with the locating the license markers 324. In other instances, copying the license files 326 may be asynchronous such that registry files and binary files or information may be relocated prior to copying. Further, copying license files 326 comprises copying data related to or indicative of the license, such as the data regarding the software version the license is correlated with the date of installation, the frequency of operation or access, and indicative of the licenses active/inactive status. Copying license files 326 may comprise generating a script or temporary file that is operator accessible. Alternatively, copying license files 326 comprises creating a directory of the copied files that is operator accessible.

The method of license archiving 330 comprises storing license files 332 as copied, in a common directory that is on a computer in communication with the server network. Also, license archiving 330 comprises logging license data 334 in a vendor-specific manner. Further, archiving license and data 336 comprises regular compiling the license files and the logged data with the historical information, for example from the common directory, such that a historical determination of each license may be generated.

Storing license files 332 comprises creating a common directory, for example on an operator server or an operator computer that is in communication with the server network. It may be understood that the operator server or operator computer are not a portion of the server network. Without limitation by theory, storing license files 332 isolated from the server network may prevent corruption of the stored files by network errors or faults and prevents the accidental deletion, over-writing, re-formatting and other potential means for losing data on a server network. Storing the license files 332 is conducted at regular intervals, for example daily or weekly. Also, storing the license files 332 may comprise creating a series of common directories, for example each directory is associated with a vendor specific software package, or a license-specific software deployment.

Logging license data 334 comprises compiling the vendor-specific and the license-specific data that is associated with the license files. Also, logging license data 334 comprises creating data files or data logs. The logging license data 334 may be executed concurrently or asynchronously with respect to storing license files 332. Further, logging license data 334 comprises creating a common directory, for example on an operator server or an operator computer that is in communication with the server network. It may be understood that the operator server or operator computer are not a portion of the server network. Likewise, logging license data 334 isolated from the server network may prevent corruption of the created data files or data logs by network errors or faults and may prevent the accidental deletion, over-writing, re-formatting and other potential means for losing data on a server network. Logging the license data 334 is conducted at regular intervals, for example daily or weekly. Also logging license data 334 may comprise creating a series of common directories, for example each directory is associated with a vendor specific software package, or a license-specific software deployment and the logged data.

Archiving license and data 336 comprise saving a copy of the common license and data directories at a regular interval in a common directory. Archiving license and data 336 accordingly provides a plurality of copies of the license files and the data files such that each common directory provides a "snap-shot" or a capture of the status of the server network, deployed software, the associated licenses, and the license data. Alternatively, archiving license and data 336 comprises compiling the stored licenses and logged data at a regular interval, in a common directory. Archiving license and data 336 accordingly provides a plurality of files that illustrate the changes of the license files and data files thereby tracking the changes or lack thereof, in the status of the server network, deployed software, the associated licenses, and the license data. Also, archiving the license and data 336 comprises including time and date information, hereinafter interval data, with each common file. Without limitation by theory, the interval data provides a means to verify the license files and logged data from a historical standpoint or in the instance of the loss of that information from the server network. Archiving the license and data 336 further comprises saving the license, associated files, and data off the network, for instance in a license-file archive 240 as illustrated in FIG. 2.

Also, archiving the license and data 336 comprises an automated initiation of the identifying license markers 322. For example, the archiving license and data 336 may be done at intervals with respect to the storing license files 332 and the logging license data 334. The completion of the archiving license and data 336 may be configurable to initiate the discovering and archiving method 300. Still further, during the archiving license and data 336 steps, it may be identified that the interval has extended beyond a predetermined point, such that the discovering and archiving 300 method is needed to update the archives. Alternatively, it may be identified that a license file or logged data is incomplete, corrupted, missing, or otherwise failed to incorporate into the license-file archive. Thus, reinitiating of the discovering and archiving 300 method provides for an automated license management method.

Figure 4:
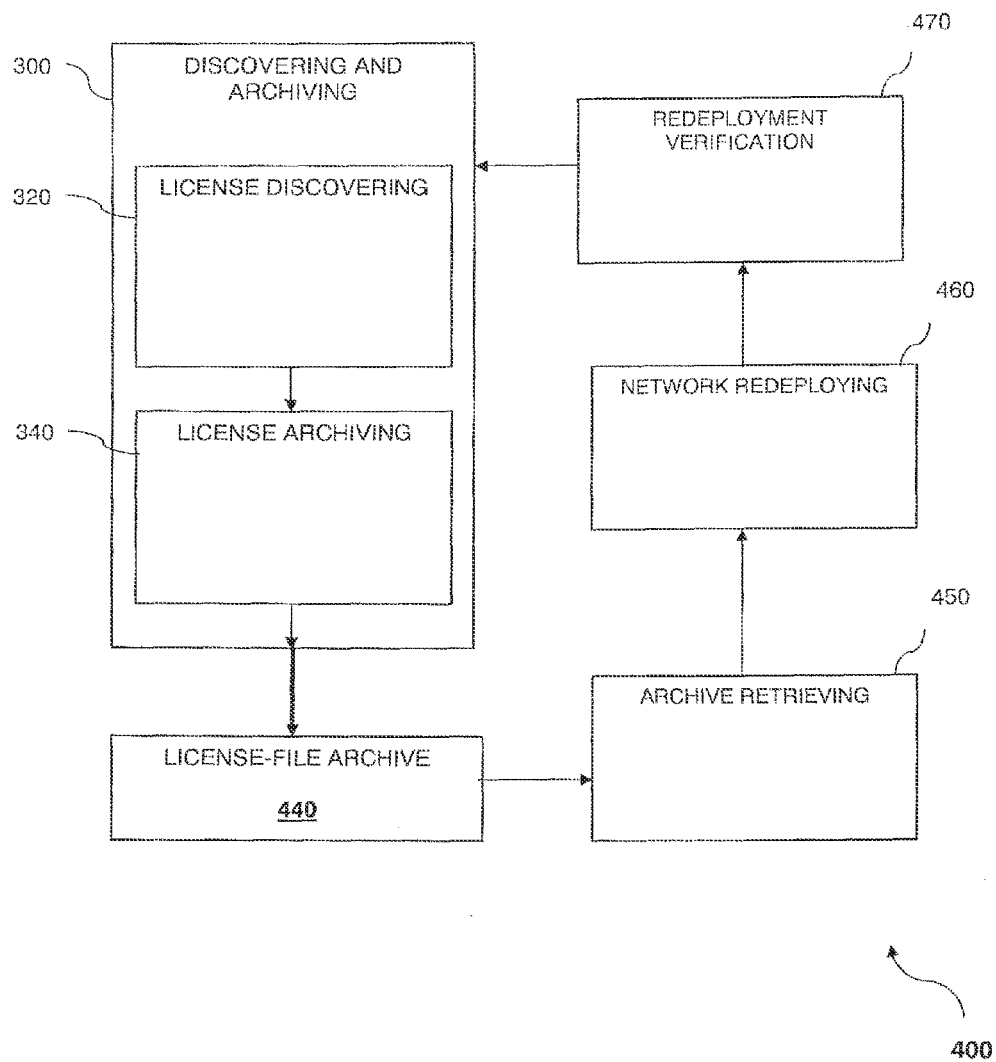
FIG. 4 illustrates an exemplary method for managing licensed files using discovering, archiving, and redeploying steps.

Referring now to FIG. 4 there is illustrated an alternate method for managing licenses 400 installed on a server network. Generally, managing licenses 400 comprises discovering and archiving 300, including license discovering 320 and license archiving 330 as disclosed hereinabove to form and update at license file archive 440. Additionally, managing licenses 400 includes archive retrieving 450, network redeploying 460, and redeployment verification 470. In generally, managing licenses 400 is utilized for redeploying or re-using an operator owned license. For example, in the case of a server decommissioning, the licenses that were archived from that device may be utilized with software that is installed on a new server. Also, in the instance of a server fault, reset, or other loss of the software installed thereon, the licenses that were archived from that server may be utilized to redeploy any software packages that are reinstalled. Likewise, in the event of a complete loss of software package information and license information, the archive may be retrieved to illustrate to a vendor: the status, version, and deployments of particular licensed software packages. Additionally, managing licenses 400 may be utilized to inventory the licenses and software deployments for auditing purposes, software upgrades, and other purposes, without limitation.

For example, archive retrieving 450 comprises accessing the license file archive 440 and retrieving the archive for a particular license. The license file archive 440 comprises the common directory including all the files and the associated data for the vendor-specific software package. Additionally, if needed the interval data from copying, storing, and archiving the license data is available. Retrieving the license 450 archive also provides an operator with information to provide a vendor during the reinstallation of the associated software packages.

Network redeploying 460 comprises reinstalling or reinserting the archived files into the server directory in order to authorize the software deployment. The archived license files and data logs provide the directory locations, as well as any of the registry locations, the encryption keys, the symbolic links, and the binary files for network redeploying 460. Additionally, the data logs provide information regarding the version and the dates installed in order to facilitate the deployment of the correct software packages.

Redeployment verification 470 comprises verifying that the software accesses the installed archival information as newly installed or reinstalled in the server directory. Additionally, redeployment verification 470 comprises providing the vendor with the new information regarding the software and the server operation. Still further, the redeployment verification 470 comprises demonstrating the inventory of valid licenses, the inventory of software installations, the inventory of software-license deployments, and in certain instances, the operator's ability to redeploy the archived license without vendor penalty. Also, redeployment verification 470 may initiate discovering and archiving 300 in order to update storing files or archiving files in view of the redeployment of an archived license.

In a further configuration of the license managing 400, retrieving the archive 450 comprises inventorying the licenses. Inventorying the licenses may include determining the number of licenses compared to the number of software installations and the number of software deployments. Additionally, inventorying the licenses by retrieving the archive 450 comprises determining the status, including expiration dates for the licenses as found in the logged data. In this configuration of license 400 managing, network redeploying 460 comprises adding, removing, or changing the software packages based on the logged data in order to avoid vendor penalties. In certain instances, archived licenses may be redeployed while others are decommissioned and removed from usage. Likewise, an archived license version may be upgraded or altered. As described herein, the redeployment verification 470 comprises verifying that the software accesses the archival licenses as newly installed or reinstalled in the server directory. Additionally, redeployment verification 470 comprises providing the vendor with the new information regarding the software and the server operation. Still further, the redeployment verification 470 comprises demonstrating the inventory of valid licenses, the inventory of software installations, the inventory of software-license deployments, and in certain instances, the operator's ability to redeploy the archived license without vendor penalty. Additionally, redeployment verification 470 may initiate discovering and archiving 300 in order to update storing or archiving licenses and data logs in view of the decommissioned or redeployed license. Reinitiating discovering and archiving 300 may provide the operator additional insurance that the most recent information is now recorded off the network, and is accessible by the operator's computer system or operators servers.

Figure 5:
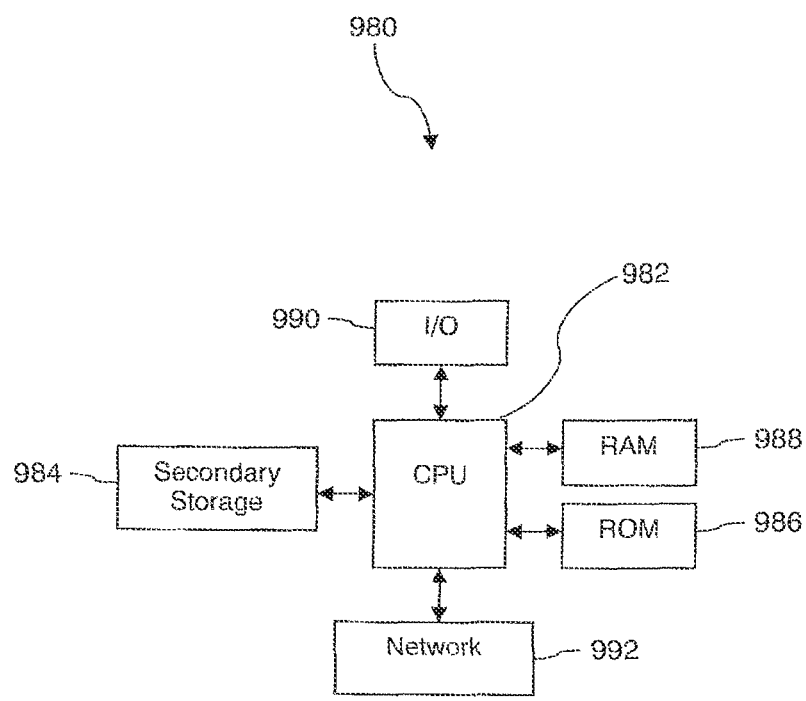
FIG. 5. illustrates an exemplary computer system suitable for implementing the several embodiments of the disclosure.

FIG. 5 illustrates a server-based computer system 980 suitable for implementing one or more embodiments disclosed herein. The server-based computer system 980 includes a processor 982, which may be referred to as a central processor unit, a computer processor unit, or a CPU. The processor 982 at is in communication with memory devices including secondary storage 984, read only memory (ROM) 986, random access memory (RAM) 988, input/output (I/O) devices 990, and network connectivity devices 992. The processor 982 may be implemented as one or more central processor units or chips.

It is understood that by programming and/or loading executable instructions, for instance from the directory disclosed hereinabove, onto the computer system 980, at least one of the central processing unit 982, the random access memory 988, and the read only memory 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 984 is typically comprised of one or more disk drives or tape drives and is used for non-volatile storage of data and as an over-flow data storage device if random access memory 988 is not large enough to hold all working data. Secondary storage 984 may be used to store programs which are loaded into random access memory 988 when such programs are selected for execution. The read only memory 986 is used to store instructions and perhaps data which are read during program execution. Read only memory 986 is a non-volatile memory device which typically has a small memory capacity relative to the larger memory capacity of secondary storage 984. The random access memory 988 is used to store volatile data and perhaps to store instructions. Access to both read only memory 986 and random access memory 988 is typically faster than to secondary storage 984. The secondary storage 984, the random access memory 988, and/or the read only memory 986 may be referred to in some contexts as computer readable storage media and/or non-transitory computer readable media.

Input/output devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 992 may enable the server-based processor 982 to communicate with the Internet, one or more intranets, and one or more users. With such a network connection, it is contemplated that the server-based processor 982 might receive information from the network, or might output information to the network in the course of performing the above-described method steps. Such information, which is often represented as a sequence of instructions to be executed using server-based processor 982, may be received from and outputted to the network, for example, in the form of a computer data signal embodied in a carrier wave.

Such information, which may include data or instructions to be executed using server-based processor 982 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The server-based processor 982 executes instructions, codes, computer programs, scripts which it accesses from hard disk, floppy disk, optical disk, such that these various disk based systems may all be considered secondary storage 984, or read only memory 986, random access memory 988, or the network connectivity devices 992. While only one server-based processor 982 is shown, multiple server-based processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the read only memory 986, and/or the random access memory 988 may be referred to in some contexts as non-transitory instructions and/or non-transitory information.

In an embodiment, the server-based computer system 980 may comprise two or more computers or servers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers or servers. In an embodiment, virtualization software may be employed by the server-based computer system 980 to provide the functionality of a number of servers that is not directly bound to the number of computers in the server-based computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the provider or another enterprise, as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the server-based computer system 980, at least portions of the contents of the computer program product to the secondary storage 984, to the read only memory 986, to the random access memory 988, and/or to other non-volatile memory and volatile memory of the server-based computer system 980 disclosed herein. The processor 982 may process the executable instructions and/or data structures in part by directly accessing the computer program product, for example by reading from a compact disk-read only memory disk (CD-ROM disk) inserted into a disk drive peripheral of the server-based computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the read only memory 986, to the random access memory 988, and/or to other non-volatile memory and volatile memory of the server-based computer system 980.

In some contexts, the secondary storage 984, the read only memory (ROM) 986, and the random access memory (RAM) 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A server software license archiving method comprising:
   identifying, by a discovery engine stored in a non-transitory memory and executable by a processor, vendor specific license markers;
   in response to identifying the vendor specific license markers, copying, by the discovery engine, a software license file associated with a software deployment on a server;
   saving, by an archiving engine stored in a non-transitory memory and executable by a processor, the software license file to a discrete directory;
   forming, by the archive engine, an archive of software license files including the software license file, wherein forming the archive comprises copying and saving the software license files at predetermined intervals, and wherein the archive comprises copies of each of the software license files and data regarding software packages associated with the software license files, deployment of the software packages, and an initial location of each of the software license files;
   retrieving the software license file from the archive; and
   redeploying the software license file from the archive with a software deployment.

2. The server software license archiving method of claim 1, wherein copying the software license file comprises locating server software files in the registry of the server or in binary form.

3. The server software license archiving method of claim 1, wherein saving the software license file comprises saving a time/date stamp with the software license files.

4. The server software license archiving method of claim 3, further comprising copying or compiling the saved software license files according to the time/date stamp.

5. The server software license archiving method of claim 1, wherein forming the archive further comprises forming an archive that is separate from the server.

6. The server software license archiving method of claim 1, wherein redeploying the software license file further comprises installing a new software deployment.

7. The server software license archiving method of claim 6, further comprising verifying the retrieved software license file and obtaining a new software license file associated with the new software deployment.

8. A server system software license archiving method, comprising:
   identifying, by a discovery engine stored in a non-transitory memory and executable by a processor, license file markers for a vendor's software deployed on a server system;
   copying, by the discovery engine, license files and any file associated with the license files on the server system identified based on the identified license file markers;
   saving, by an archiving engine stored in a non-transitory memory and executable by a processor, the copied files to a common directory;
   forming, by the archive engine, an archive of software license files including the copied files, wherein forming the archive comprises copying and saving the software license files at predetermined intervals, and wherein the archive comprises copies of each of the software license files and data regarding software packages associated with the software license files, deployment of the software packages, and an initial location of each of the software license files;
   accessing the archive to identify a license file; and
   providing the license file to the vendor for use with a software deployment on one or more server systems.

9. The server system software license archiving method of claim 8, wherein identifying the license file markers further comprises identifying vendor specific license markers.

10. The server system software license archiving method of claim 9, further comprising locating files containing the license file markers in the registry of the server or in binary form.

11. The server system software license archiving method of claim 8, wherein saving the copied files comprises saving a time/date stamp with the software license files.

12. The server system software license archiving method of claim 11, further comprising copying or compiling the saved software license files according to the time/date stamp.

13. The server system software license archiving method of claim 8, wherein the archive is stored on a computer or a server that is separate from the server system.

14. The server system software license archiving method of claim 8, wherein the archive further comprises copying and saving all related software license files and data related to the software license files.

15. The server system software license archiving method of claim 8, wherein providing the license file comprises providing the vendor with an inventory of licenses and software packages on the server system based on the archive.

16. A system for archiving software licenses, comprising:
   a server system configured to host a network, wherein the server system comprises a plurality of software packages associated with a plurality of license files;
   a non-transitory memory;
   a processor; and
   an application stored in the non-transitory memory that, when executed by the processor:
      identifies vendor-specific license file markers associated with server software license files for software packages;
      locates vendor-specific software license files on the server system based on the identified vendor-specific license file markers;
      copies the vendor-specific software license files;
      saves the vendor-specific software license files to a common directory; and
      forms an archive of software license files including the vendor-specific software license files by copying and saving the software license files at predetermined intervals, wherein the archive comprises copies of each of the software license files and data regarding software packages associated with the software license files, deployment of the software packages, and an initial location of each of the software license files.

17. The system for archiving software licenses of claim 16, wherein the vendor-specific server software license files comprise files in the registry of the server or in binary form.

18. The system for archiving software licenses of claim 16, wherein the application saving the vendor-specific software license files to a common directory comprises saving a time/date stamp with each software license file.

19. The system for archiving software licenses of claim 16, wherein the application forming the archive further comprises inventorying the license files, associated files, and software packages on the server system.

* * * * *